US012637169B2

(12) United States Patent
Binder

(10) Patent No.: US 12,637,169 B2
(45) Date of Patent: May 26, 2026

(54) METHOD FOR OPERATING A DRIVE UNIT OF AN ELECTRIC BICYCLE

(71) Applicant: Robert Bosch GmbH, Stuttgart (DE)

(72) Inventor: Julian Binder, Wannweil (DE)

(73) Assignee: Robert Bosch GmbH, Stuttgart (DE)

( * ) Notice: Subject to any disclaimer, the term of this patent is extended or adjusted under 35 U.S.C. 154(b) by 444 days.

(21) Appl. No.: 18/468,369

(22) Filed: Sep. 15, 2023

(65) Prior Publication Data

US 2024/0092453 A1 Mar. 21, 2024

(30) Foreign Application Priority Data

Sep. 16, 2022 (DE) ..................... 10 2022 209 775.0

(51) Int. Cl.
B62M 6/45 (2010.01)
B62M 6/55 (2010.01)

(52) U.S. Cl.
CPC ................ B62M 6/45 (2013.01); B62M 6/55 (2013.01)

(58) Field of Classification Search
CPC . B62M 6/45; B62M 6/55; B62J 45/413; B62J 45/421
USPC .......................................... 180/206.2, 206.3
See application file for complete search history.

(56) References Cited

U.S. PATENT DOCUMENTS

| | | | | |
|---|---|---|---|---|
| 2012/0012412 A1* | 1/2012 | Moeller | ................... | B62M 6/65 |
| | | | | 180/206.2 |
| 2022/0355897 A1* | 11/2022 | Baumgaertner | ....... | B62J 45/411 |
| 2024/0092453 A1* | 3/2024 | Binder | ..................... | B62M 6/55 |

FOREIGN PATENT DOCUMENTS

| | | | | | |
|---|---|---|---|---|---|
| DE | 10 2014 206 818 A1 | 10/2015 | | | |
| DE | 10 2019 107 226 A1 | 10/2019 | | | |
| EP | 3 663 181 A1 | 6/2020 | | | |
| ES | 3034822 A1 | * | 8/2025 | ............... | F16H 1/28 |
| JP | 2001-114184 A | | 4/2001 | | |
| JP | 2002540868 A | * | 12/2002 | ....... | A63B 21/00181 |
| JP | 2017088155 A | * | 5/2017 | ............... | B60L 7/10 |
| TW | 1712541 B | * | 12/2020 | | |
| WO | WO-2025160673 A1 | * | 8/2025 | ......... | A63B 24/0087 |

* cited by examiner

*Primary Examiner* — Paul N Dickson
*Assistant Examiner* — Matthew D Lee
(74) *Attorney, Agent, or Firm* — Maginot, Moore & Beck LLP

(57) ABSTRACT

A method for operating a drive unit of an electric bicycle is disclosed. The method includes: determining a cadence of a crank drive of the electric bicycle, and operating the drive unit in a controlled manner to generate a drive power as a function of the determined cadence and on the basis of a power characteristics map of the drive unit. The power characteristics map includes a power characteristic curve which defines a predetermined relationship between the drive power of the drive unit and the current cadence, and the power characteristics map includes a maximum power range within which the power characteristic curve defines a maximum drive power of the drive unit. The maximum power range is within a cadence range that can be set by a rider of the electric bicycle.

17 Claims, 2 Drawing Sheets

METHOD FOR OPERATING A DRIVE UNIT OF AN ELECTRIC BICYCLE

This application claims priority under 35 U.S.C. § 119 to patent application no. DE 10 2022 209 775.0, filed on Sep. 16, 2022 in Germany, the disclosure of which is incorporated herein by reference in its entirety.

The present disclosure relates to a method for operating a drive unit of an electric bicycle as well as to an electric bicycle.

BACKGROUND

Electric bicycle wheels with drive units to support driver torque generated by a driver by means of motor force are known. The drive power of the motor support is often regulated as a function of a cadence as the rider pedals. The design is typically such that a maximum motor torque is available up to a certain set cadence. This cadence is often followed by a constant power range that is limited to a predetermined power output. As the cadence increases, the torque is reduced to maintain a constant power output. For a rider of the electric bicycle, the optimal energy efficiency is thus in the range of this set cadence, for example, so that the rider will often adjust their riding style accordingly.

SUMMARY

The method according to the disclosure, on the other hand, offers the advantage that it creates a simple and cost-efficient way to enable a particularly flexibly adaptable power output of a drive unit of an electric bicycle. A rider of the electric bicycle can in particular optimally adapt the power output to their own individual riding behavior. This is achieved with a method for operating a drive unit of an electric bicycle comprising the steps:

determining a cadence of a crank drive of the electric bicycle, and operating the drive unit in a controlled manner to generate a drive power as a function of the determined cadence and also on the basis of a power characteristics map of the drive unit.

The power characteristics map includes a power characteristic curve which defines a predetermined, in particular mathematical, relationship between the drive power of the drive unit to be generated and the determined current cadence. The power characteristics map includes a maximum power range within which the power characteristic curve defines a maximum drive power of the drive unit. The maximum power range is within a cadence range that can be set by a rider of the electric bicycle.

In other words, in the method, the drive power provided by the drive unit of the electric bicycle is regulated as a function of the power characteristics map. The power characteristics map unambiguously defines the level of the drive power to be generated as a function of the cadence, which is in particular produced by the rider's pedaling, using the power characteristic curve. The range of the power characteristics map in which the maximum possible drive power of the drive unit, namely the maximum drive power defined by the power characteristic curve, can flexibly be adapted to a desired cadence range by the rider of the electric bicycle. The rider can in particular set a lower and an upper limit of the cadence range. Preferably, therefore, a maximum of the power characteristic curve is present within the cadence range.

The method thus offers the advantage that the power output of the drive unit can be particularly flexibly adapted as a function of the rider's pedaling in a simple manner. This in particular allows the rider to optimally adapt the range of the maximum power output to their individual riding style. A sporty rider who pedals at a high average cadence, for example, can thus set the maximum power range to their preferred cadences. In addition to providing individual optimal efficiency in terms of the propulsion of the electric bicycle, this makes it possible to provide a particularly high level of ride comfort for each rider.

Further developments of the disclosure is also disclosed below.

The power characteristic curve is preferably constant throughout the entire maximum power range. In other words, the maximum drive power is constant throughout the settable cadence range. The motor power of the drive unit can thus optimally support the rider as they pedals within their preferred frequency range.

The power characteristic curve particularly preferably has a first linear range between a cadence of zero and a first cadence. In the first linear range, the drive power is defined to be directly proportional to the cadence. The power characteristic curve is thus in particular defined in the first linear range as a straight line which has a predetermined slope greater than zero. The drive power generated by the drive unit therefore increases continuously as the cadence increases.

The power characteristic curve preferably has a second linear range between the first cadence and a second cadence. The second cadence is in particular higher than the first cadence. The second cadence corresponds to a minimum cadence of the cadence range that can be set by the rider. In the second linear range, the drive power is defined to be directly proportional to the cadence. Dividing the power characteristic curve into the two separate linear ranges thus enables a particularly flexible adaptation to an optimal efficiency of the individual riding style.

The second linear range further preferably has a lower slope than the first linear range. The slope of the second linear range is in particular at most 90%, preferably at most 70%, of the slope of the first linear range. The drive power can thus be provided in an optimized manner, wherein both a high level of support for the rider over all cadences and the provision of the maximum drive power within the desired cadence range can be ensured.

The first cadence is particularly preferably defined by a first point on the first linear range and the one predetermined first power difference is below the maximum drive power. In other words, the first cadence is lower than the second cadence and is in particular defined by an end point of the first linear range. A frequency difference between the second frequency and the first cadence results in particular from the first power difference and the first linear range. A particularly advantageous transition between the first linear range and the maximum power range can thus be made possible. The first power difference is preferably at least 50 W, preferably at least 100 W, in particular at most 350 W, particularly preferably 200 W.

The power characteristic curve preferably has a third linear range which directly adjoins the second linear range. In the third linear range, the drive power is defined to be directly proportional to the cadence. The third linear range has a negative slope. In other words, at cadences that are higher than a maximum cadence of the settable cadence range, the drive power is reduced. This makes it possible to provide a precisely defined optimal range for the operating mode of the drive unit, wherein an exceedance of the permitted maximum power can reliably be avoided.

The power characteristic curve preferably also has a constant range which, in particular in the direction of higher cadences, directly adjoins the third linear range and within which the power characteristic curve defines a constant reduction drive power. In other words, when the maximum cadence of the third linear range is exceeded, the drive power of the drive unit remains constant even if the cadences continue to increase. In particular, there is therefore a lower drive power in the constant range than in the settable cadence range. A particularly simple control of the drive unit as a function of the cadences can thus be provided.

The third linear range is further preferably between a third cadence and a fourth cadence. The third cadence corresponds to a maximum cadence of the settable cadence range. The fourth cadence is defined by a fourth point, which is a predetermined second power difference below the maximum drive power and/or which is above a third cadence by a predetermined cadence difference. The third cadence corresponds to a maximum cadence of the settable cadence range. The third linear range in particular has a predetermined slope.

The second power difference is particularly preferably at least 20 W, preferably at least 50 W, in particular at most 200 W, particularly preferably 100 W. Alternatively or additionally, the cadence difference is at least 2 rpm, preferably at least 5 rpm, in particular at most 20 rpm, in particular preferably 10 rpm. Rpm is in particular considered to be revolutions per minute.

The disclosure furthermore leads to an electric bicycle comprising a drive unit and a control unit. The control unit is configured to operate the drive unit in a controlled manner. The control unit is further configured to carry out the above-described method. The electric bicycle thus allows a particularly flexible adaptation of the drive characteristics to the individual wishes of the respective rider with a simple and cost-efficient structural design.

The electric bicycle preferably further comprises an input unit which is configured to receive a user input of a rider of the electric bicycle. The input unit is configured to transmit a signal based on the user input to the control unit. The desired cadence range can thus in particular be entered by the rider of the electric bicycle via the input unit in order to be able to influence the control of the drive unit in a targeted manner.

BRIEF DESCRIPTION OF THE DRAWINGS

Exemplary embodiments of the disclosure are described in detail in the following with reference to the accompanying drawing. The drawing shows.

DETAILED DESCRIPTION

Figure 1:
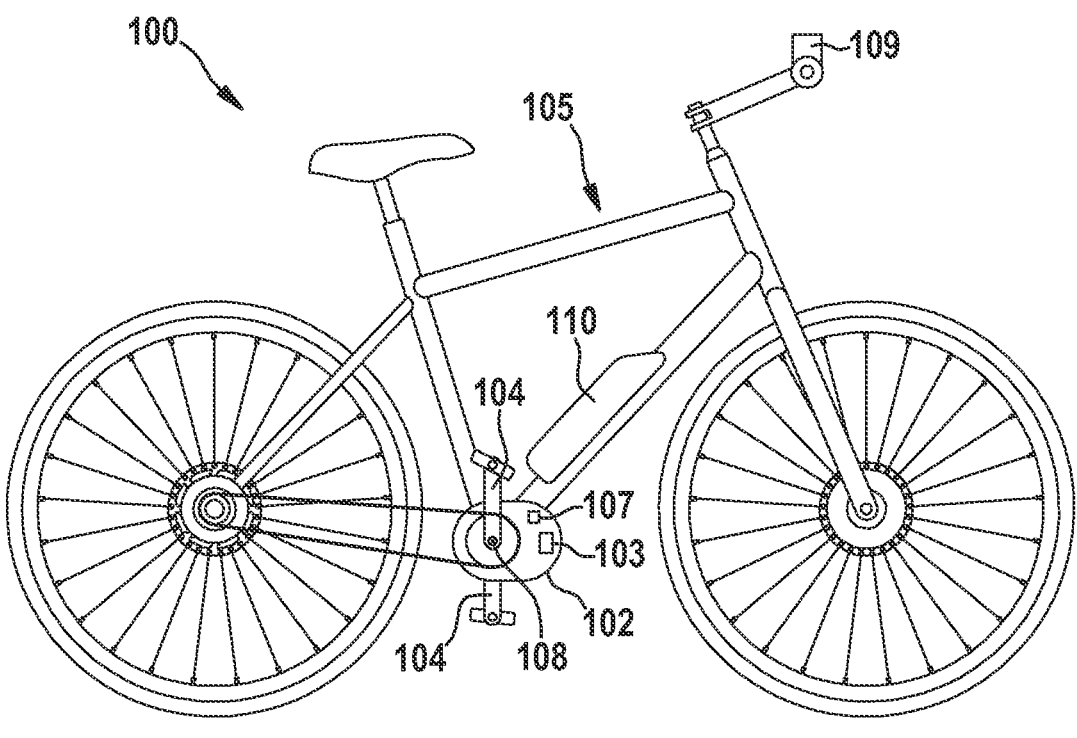
FIG. 1 a simplified schematic view of an electric bicycle in which a method for operating the electric bicycle is carried out according to a preferred exemplary embodiment of the disclosure, and FIG. 2 a simplified illustration of a power characteristics map used to carry out the method according to the preferred exemplary embodiment.

FIG. 1 shows a simplified schematic view of an electric bicycle 100. The electric bicycle 100 comprises a drive unit 102 which is configured as an electric motor. The drive unit 102 is disposed in the region of a bottom bracket 108 of the electric bicycle 100 and is provided to support a manual pedal force of a rider of the electric bicycle 100 applied via a crank drive 104 with a torque generated by an electric motor.

The electric bicycle 100 further comprises an electrical energy store 110, by means of which the drive unit 102 can be supplied with electrical energy. The drive unit 102 also comprises an integrated control unit 103.

The control unit 103 is configured to operate the drive unit 102 as a function of the pedaling of a rider of the electric bicycle 100. Specifically, the drive unit 102 is actuated in a controlled manner such that a motor torque is generated as a function of a rider torque generated by the rider's muscle power to provide motor support to the rider as they pedal. It is provided that the drive power generated by the drive unit 102 is controlled as a function of a cadence with which the rider actuates the crank drive 104. The cadence can be acquired by means of a cadence sensor 107, for example.

The control unit 103 is configured to carry out a method for operating the drive unit 102. The method allows an optimized actuation of the drive unit 102 as a function of the cadence as the bicycle is being ridden, i.e., in particular when the electric bicycle 100 is moving.

The sequence of the method is described in detail in the following with reference to FIG. 2.

Figure 2:
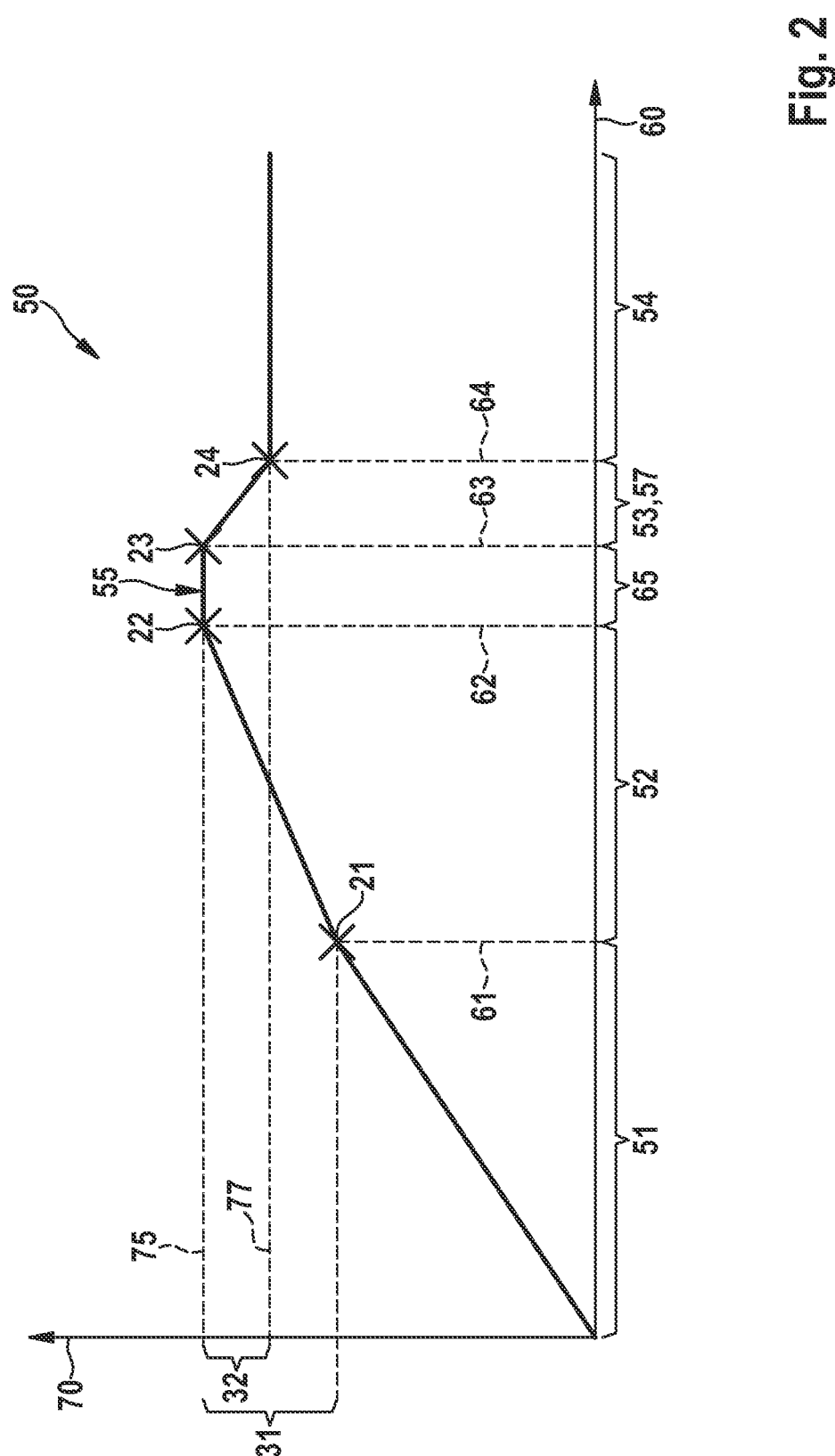

FIG. 2 shows a simplified illustration of a power characteristics map 50 used to carry out the method according to the preferred exemplary embodiment. The power characteristics map 50 includes a power characteristic curve 50 that defines a predetermined relationship between the drive power 70 to be generated by the drive unit 102 and the determined current cadence 60.

In the method, the drive unit 102 is operated in a controlled manner such that the drive unit 102 generates a drive power 70 defined in accordance with the power characteristic curve 5 as a function of the determined cadence 60.

As can be seen in FIG. 2, the power characteristic curve 5 has different ranges in which different relationships between the drive power 70 and the cadence 60 are produced. These are described in the following.

Starting from the coordinate origin of the power characteristics map 50, i.e., starting from a drive power 70 and a cadence 60 which are both zero, there is a first linear range 51 of the power characteristic curve 5. In the first linear range 51, the drive power 70 is generated in direct proportion to the cadence 60. The first linear range 51 extends to a first cadence 61.

Adjoining the first linear range 51, i.e., starting directly from the first cadence 61 to higher cadences 60, there is a second linear range 52 of the power characteristic curve 5. In the second linear range 52, the drive power 70 is likewise defined to be directly proportional to the cadence 60. The second linear range 52 has a lower slope than the first linear range 51. The second linear range 52 extends to a second cadence 62.

Adjoining the second linear range 52, i.e., starting directly from the second cadence 52 to higher cadences 60, there is a maximum power range 55 within which the power characteristic curve 5 is constant. Specifically, in the maximum power range 55, the power characteristic curve 5 defines a maximum drive power 75 of the drive unit 102. The maximum drive power 75 is preferably a predetermined value, which can correspond to a design-related maximum power that can be generated by the drive unit 102, for example.

The maximum power range 55 extends from the second cadence 62 to a third cadence 63, which define a cadence range 65 between them. This cadence range 65 can be flexibly adapted in the method by a user input of the rider of the electric bicycle 100. Specifically, the second cadence 62 and the third cadence 63 can be flexibly set by the user input of the rider. This allows the rider to flexibly adapt the operating mode of the drive unit 102 in such a way that it always generates the maximum drive power 75 within the individually preferred cadence range 65. This makes it possible to individually provide a particularly high level of ride comfort for each rider when they ride the electric bicycle 100.

The cadence range 65 can, for example, be set by means of a user input via an input unit 109 (see FIG. 1). The user input is preferably transmitted from the input unit 109 as a signal to the control unit 103.

The first slope of the first linear range 51 is preferably fixedly defined.

The second slope of the second linear range 52 is preferably obtained using the following rules: specifically, the second linear range 52 forms a connecting line between a first point 21 on the first linear range and a second point 22 on a straight line parallel to the X-axis 60 at the level of the maximum drive power 75 and is additionally defined by the second cadence 62. The first point 21 is unambiguously defined by the point on the first linear range 51 that lies below the maximum drive power 75 in the direction of lower cadences 60 by a predetermined first power difference 31, for example 200 W. In other words, the first cadence 61 results indirectly from the second cadence 62 and the first power difference 31.

Starting from the third cadence 63 to the higher cadence 60, there is an adjoining third linear range 53, in which the drive power 70 is again defined to be directly proportional to the cadence 60, wherein the third linear range 53 has a negative slope. In other words, at higher cadences 60 above the third cadence 63, the drive power 70 is reduced.

The slope of the third linear range 53 is defined by a predetermined second power difference 32, for example 100 W, and a predetermined cadence difference 57, for example 10 rpm. The third linear range 53 thus extends from the third cadence 63 to a fourth cadence 64, i.e., between a third point 23 and a fourth point 24 on the power characteristic curve 5.

Starting from the fourth cadence 64 or from the fourth point 24, there is an adjoining constant range 54, in which the power characteristic curve 5 defines a constant reduction drive power 77 that, in accordance with the predetermined second power difference 32, is lower than the maximum drive power 75.

What is claimed is:

1. A method for operating a drive unit of an electric bicycle, comprising:
   determining a cadence of a crank drive of the electric bicycle; and
   operating the drive unit in a controlled manner to generate a drive power as a function of the determined cadence and on the basis of a power characteristics map of the drive unit,
   wherein the power characteristics map includes a power characteristic curve which defines a predetermined relationship between the drive power of the drive unit and the current cadence,
   wherein the power characteristics map includes a maximum power range within which the power characteristic curve defines a maximum drive power of the drive unit, and
   wherein the maximum power range is within a cadence range that can be set by a rider of the electric bicycle.

2. The method according to claim 1, wherein the power characteristic curve is constant throughout the maximum power range.

3. The method according to claim 1, wherein:
   the power characteristic curve has a first linear range between a cadence of zero and a first cadence, and
   the drive power is directly proportional to the cadence in the first linear range.

4. The method according to claim 3, wherein:
   the power characteristic curve has a second linear range between the first cadence and a second cadence,
   the second cadence corresponds to a minimum cadence of the settable cadence range, and
   the drive power is directly proportional to the cadence in the second linear range.

5. The method according to claim 4, wherein the second linear range has a lower slope than the first linear range.

6. The method according to claim 3, wherein:
   the first cadence is defined by a first point on the first linear range, and
   the one predetermined first power difference is below the maximum drive power.

7. The method according to claim 6, wherein the first power difference is at least 50 W.

8. The method according to claim 4, wherein:
   the power characteristic curve has a third linear range which adjoins the second linear range,
   the drive power is directly proportional to the cadence in the third linear range, and
   the third linear range has a negative slope.

9. The method according to claim 8, wherein:
   the power characteristic curve further has a constant range which adjoins the third linear range, and
   the power characteristic curve defines a constant reduction drive power.

10. The method according to claim 9, wherein:
   the third linear range is between a third cadence and a fourth cadence,
   the third cadence corresponds to a maximum cadence of the settable cadence range,
   the fourth cadence is defined by a fourth point,
   the one predetermined second power difference is below the maximum drive power and/or the one predetermined cadence difference is above a third cadence.

11. The method according to claim 10, wherein:
   the second power difference is at least 20 W and at most 200 W, and/or
   the cadence difference is at least 2 rpm and at most 20 rpm.

12. An electric bicycle, comprising:
   a drive unit; and
   a control unit which is configured to actuate the drive unit in a controlled manner,
   wherein the control unit is further configured to carry out a method according to claim 1.

13. The electric bicycle according to claim 12, further comprising an input unit which is configured to receive a user input of a rider of the electric bicycle,
   wherein the input unit is configured to transmit a signal based on the user input to the control unit.

14. The method according to claim 6, wherein the first power difference is at least 100 W.

15. The method according to claim 6, wherein the first power difference is at most 350 W.

16. The method according to claim 6, wherein the first power difference is 200 W.

17. The method according to claim 10, wherein:
the second power difference is 100 W, and/or
the cadence difference is 10 rpm.

\* \* \* \* \*